(12) United States Patent
Gauba et al.

(10) Patent No.: US 8,768,844 B2
(45) Date of Patent: Jul. 1, 2014

(54) METHOD AND SYSTEM FOR CONTENT SHARING AND AUTHENTICATION BETWEEN MULTIPLE DEVICES

(75) Inventors: Ravi Gauba, Fremont, CA (US); Curtis Ray Eubanks, Lakewood, CO (US); Klaus Hofrichter, Santa Clara, CA (US); Annie Wang, San Jose, CA (US); Clement Lau, Los Altos, CA (US); Joseph Alexander Dara-Abrams, Los Altos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 3375 days.

(21) Appl. No.: 10/960,383

(22) Filed: Oct. 6, 2004

(65) Prior Publication Data
US 2006/0074807 A1  Apr. 6, 2006

(51) Int. Cl.
*G06F 21/00* (2013.01)

(52) U.S. Cl.
USPC .................. 705/51; 705/50; 705/57; 380/227; 380/228; 380/229; 380/230

(58) Field of Classification Search
CPC ................................ G06F 21/00; G06Q 30/06
USPC ...................................................... 705/51–59
See application file for complete search history.

(56) References Cited

U.S. PATENT DOCUMENTS

| 4,745,549 A | 5/1988 | Hashimoto |
| 4,965,825 A | 10/1990 | Harvey et al. |
| 5,134,499 A | 7/1992 | Sata et al. |
| 5,223,924 A | 6/1993 | Strubbe |
| 5,231,494 A | 7/1993 | Wachob |
| 5,371,551 A | 12/1994 | Logan et al. |
| 5,406,626 A | 4/1995 | Ryan |
| 5,457,746 A * | 10/1995 | Dolphin .......................... 705/51 |
| 5,481,296 A | 1/1996 | Cragun et al. |
| 5,483,277 A | 1/1996 | Granger |

(Continued)

FOREIGN PATENT DOCUMENTS

| EP | 0676756 | 10/1995 |
| EP | 0726574 | 8/1996 |

(Continued)

OTHER PUBLICATIONS

"TiVo brings home HBO through agreement benefiting personal television service users" Press Release, "Online!" Jan. 28, 1999, XP002154115, Retrieved from the Internet: <URL:www.tivo.com?, retrieved on Nov. 29, 2000.

(Continued)

*Primary Examiner* — James A Reagan
(74) *Attorney, Agent, or Firm* — Blakely, Sokoloff, Taylor & Zafmmn LLP

(57) ABSTRACT

A personal video recorder (PVR) enables delivery of audiovisual content and associated metadata to storage devices. The PVR is configured to access a plurality of services using a plurality of storage modules. Each storage module is dedicated to a single designated content provider. One or more of the storage modules are removably coupled to the PVR. A disconnected storage module can be reconnected to another PVR different from the PVR from which the storage module was disconnected. Where authorization is required to access content stored on the storage module, authentication is performed each time the removable storage module is reconnected to a PVR.

54 Claims, 8 Drawing Sheets

(56) References Cited

U.S. PATENT DOCUMENTS

| | | | |
|---|---|---|---|
| 5,483,278 A | 1/1996 | Strubbe et al. | |
| 5,524,051 A | 6/1996 | Ryan | |
| 5,534,911 A | 7/1996 | Levitan | |
| 5,553,281 A | 9/1996 | Brown et al. | |
| 5,563,946 A * | 10/1996 | Cooper et al. | 705/56 |
| 5,590,195 A | 12/1996 | Ryan | |
| 5,614,940 A | 3/1997 | Cobbley et al. | |
| 5,619,249 A | 4/1997 | Billock et al. | |
| 5,625,464 A | 4/1997 | Compoint et al. | |
| 5,635,979 A | 6/1997 | Kostreski et al. | |
| 5,638,443 A | 6/1997 | Stefik et al. | |
| 5,652,613 A | 7/1997 | Lazarus et al. | |
| 5,699,107 A | 12/1997 | Lawler et al. | |
| 5,740,549 A | 4/1998 | Reilly et al. | |
| 5,748,890 A | 5/1998 | Goldberg et al. | |
| 5,751,806 A | 5/1998 | Ryan | |
| 5,758,257 A | 5/1998 | Herz et al. | |
| 5,758,259 A | 5/1998 | Lawler | |
| 5,786,845 A | 7/1998 | Tsuria | |
| 5,790,177 A | 8/1998 | Kassatly | |
| 5,790,935 A | 8/1998 | Payton | |
| 5,797,010 A | 8/1998 | Brown | |
| 5,798,785 A | 8/1998 | Hendricks et al. | |
| 5,805,763 A | 9/1998 | Lawler et al. | |
| 5,826,102 A | 10/1998 | Escobar et al. | |
| 5,852,435 A | 12/1998 | Vigneaux et al. | |
| 5,861,881 A | 1/1999 | Freeman et al. | |
| 5,861,906 A | 1/1999 | Dunn et al. | |
| 5,884,056 A | 3/1999 | Steele | |
| 5,892,900 A | 4/1999 | Ginter et al. | |
| 5,900,905 A | 5/1999 | Shoff et al. | |
| 5,907,321 A | 5/1999 | Grossman et al. | |
| 5,920,700 A | 7/1999 | Gordon et al. | |
| 5,931,908 A | 8/1999 | Gerba et al. | |
| 5,949,954 A | 9/1999 | Young et al. | |
| 5,982,363 A | 11/1999 | Naiff | |
| 5,995,155 A | 11/1999 | Schindler et al. | |
| 6,002,394 A | 12/1999 | Schein et al. | |
| 6,029,045 A | 2/2000 | Picco et al. | |
| 6,029,046 A | 2/2000 | Khan et al. | |
| 6,064,380 A | 5/2000 | Swenson et al. | |
| 6,078,360 A | 6/2000 | Doornhein et al. | |
| 6,081,533 A | 6/2000 | Laubach et al. | |
| 6,084,581 A | 7/2000 | Hunt | |
| 6,144,375 A | 11/2000 | Jain et al. | |
| 6,160,570 A | 12/2000 | Sitnik | |
| 6,173,406 B1 | 1/2001 | Wang et al. | |
| 6,175,925 B1 | 1/2001 | Nardone et al. | |
| 6,177,931 B1 | 1/2001 | Alexander et al. | |
| 6,178,509 B1 | 1/2001 | Nardone et al. | |
| 6,182,050 B1 | 1/2001 | Ballard | |
| 6,205,550 B1 | 3/2001 | Nardone et al. | |
| 6,215,526 B1 | 4/2001 | Barton et al. | |
| 6,226,444 B1 | 5/2001 | Goldschmidt et al. | |
| 6,233,389 B1 | 5/2001 | Barton et al. | |
| 6,236,395 B1 | 5/2001 | Sezan et al. | |
| 6,237,786 B1 | 5/2001 | Ginter et al. | |
| 6,253,193 B1 | 6/2001 | Ginter et al. | |
| 6,264,560 B1 | 7/2001 | Goldberg et al. | |
| 6,269,369 B1 | 7/2001 | Robertson | |
| 6,289,346 B1 | 9/2001 | Milewski et al. | |
| 6,304,714 B1 | 10/2001 | Krause et al. | |
| 6,310,886 B1 | 10/2001 | Barton | |
| 6,327,418 B1 | 12/2001 | Barton | |
| 6,338,139 B1 | 1/2002 | Ando et al. | |
| 6,359,636 B1 | 3/2002 | Schindler et al. | |
| 6,366,296 B1 | 4/2002 | Boreczky et al. | |
| 6,377,861 B1 | 4/2002 | York | |
| 6,385,739 B1 | 5/2002 | Barton et al. | |
| 6,416,714 B1 * | 7/2002 | Nova et al. | 506/39 |
| 6,434,535 B1 * | 8/2002 | Kupka et al. | 705/24 |
| 6,434,747 B1 | 8/2002 | Khoo et al. | |
| 6,460,036 B1 | 10/2002 | Herz | |
| 6,463,444 B1 | 10/2002 | Jain et al. | |
| 6,468,160 B2 * | 10/2002 | Eliott | 463/43 |
| 6,476,825 B1 | 11/2002 | Croy et al. | |
| 6,483,986 B1 | 11/2002 | Krapf | |
| 6,487,646 B1 | 11/2002 | Adams et al. | |
| 6,490,722 B1 | 12/2002 | Barton et al. | |
| 6,493,878 B1 | 12/2002 | Kassatly | |
| 6,498,895 B2 | 12/2002 | Young et al. | |
| 6,512,837 B1 | 1/2003 | Ahmed | |
| 6,516,467 B1 | 2/2003 | Schindler et al. | |
| 6,519,571 B1 | 2/2003 | Guheen et al. | |
| 6,526,577 B1 | 2/2003 | Knudson et al. | |
| 6,535,253 B2 | 3/2003 | Barton et al. | |
| 6,574,378 B1 | 6/2003 | Lim | |
| 6,584,552 B1 | 6/2003 | Kuno et al. | |
| 6,611,607 B1 | 8/2003 | Davis et al. | |
| 6,614,987 B1 | 9/2003 | Ismail et al. | |
| 6,625,295 B1 | 9/2003 | Wolfgang et al. | |
| 6,628,344 B1 | 9/2003 | Weber | |
| 6,636,273 B1 | 10/2003 | Weber | |
| 6,640,145 B2 | 10/2003 | Hoffberg et al. | |
| 6,642,939 B1 | 11/2003 | Vallone et al. | |
| 6,643,798 B2 | 11/2003 | Barton et al. | |
| 6,678,389 B1 | 1/2004 | Sun et al. | |
| 6,697,948 B1 * | 2/2004 | Rabin et al. | 726/30 |
| 6,714,683 B1 | 3/2004 | Tian et al. | |
| 6,728,713 B1 | 4/2004 | Beach et al. | |
| 6,748,080 B2 | 6/2004 | Russ et al. | |
| 6,757,837 B1 | 6/2004 | Platt et al. | |
| 6,757,906 B1 | 6/2004 | Look et al. | |
| 6,848,002 B1 | 1/2005 | Detlef | |
| 6,865,550 B1 * | 3/2005 | Cok | 705/51 |
| 6,868,403 B1 | 3/2005 | Wiser et al. | |
| 7,058,414 B1 * | 6/2006 | Rofheart et al. | 455/456.4 |
| 7,123,813 B2 | 10/2006 | Inoue | |
| 7,206,497 B1 | 4/2007 | Boyle et al. | |
| 7,231,669 B2 * | 6/2007 | Leung et al. | 726/26 |
| 7,359,883 B2 * | 4/2008 | Namba et al. | 705/59 |
| 7,546,627 B2 | 6/2009 | Kawai | |
| 2001/0018742 A1 | 8/2001 | Hiraiq | |
| 2002/0023230 A1 | 2/2002 | Bolnick et al. | |
| 2002/0040439 A1 | 4/2002 | Kellum | |
| 2002/0040475 A1 * | 4/2002 | Yap et al. | 725/39 |
| 2002/0059614 A1 | 5/2002 | Lipsanen et al. | |
| 2002/0083157 A1 | 6/2002 | Sekiguchi et al. | |
| 2002/0106197 A1 | 8/2002 | Boyle | |
| 2002/0138761 A1 | 9/2002 | Kanemark et al. | |
| 2002/0170068 A1 | 11/2002 | Rafey et al. | |
| 2003/0088872 A1 | 5/2003 | Maissel et al. | |
| 2003/0126432 A1 | 7/2003 | Tonisson | |
| 2003/0149988 A1 | 8/2003 | Ellis et al. | |
| 2003/0154390 A1 | 8/2003 | Yamauchi et al. | |
| 2003/0174861 A1 | 9/2003 | Levy et al. | |
| 2003/0219127 A1 | 11/2003 | Russ et al. | |
| 2003/0221100 A1 | 11/2003 | Russ et al. | |
| 2004/0083377 A1 | 4/2004 | Wu et al. | |
| 2004/0107368 A1 | 6/2004 | Colvin et al. | |
| 2004/0117320 A1 | 6/2004 | Morioka et al. | |
| 2004/0117663 A1 | 6/2004 | Colvin | |
| 2004/0177369 A1 * | 9/2004 | Akins, III | 725/31 |
| 2005/0144641 A1 | 6/2005 | Lewis | |
| 2005/0204392 A1 | 9/2005 | Na | |
| 2005/0289617 A1 | 12/2005 | Safadi et al. | |
| 2006/0212900 A1 | 9/2006 | Ismail et al. | |

FOREIGN PATENT DOCUMENTS

| | | |
|---|---|---|
| EP | 0862/328 | 9/1998 |
| JP | EP 0726574 A2 * | 8/1996 |
| WO | WO 80/02093 | 10/1980 |
| WO | WO 94/13107 | 6/1994 |
| WO | WO 97/41690 | 11/1997 |

OTHER PUBLICATIONS

"Metabyte Announces Personalized TV Software", Press Release, "Online!", Jan. 21, 1999, XP002154116, Retrieved from the Internet; URLURL:www.mbtv.com.

"Automatic Constructions of Personalized TV News Programs", Association of Computing Machinery (ACM) Multimedia Conf., 323-331 (Presented Nov. 3, 1999).

(56) References Cited

OTHER PUBLICATIONS

Electronic House Com, EchoStart Communications Corporation and Geocast Network Systems Align to Delivery New Personalized Interactive Broadband Services to PC Users Via Satellita, Jun. 4, 2002, http://209.6.10.99/news101600echostar.html, 3 pages.

Lost Remote, The TV Revolution is Coming, Lost Remote TV New Media & Television Convergence News, TV News Gets (too?) Personal by Cory Bergman, Sep. 25, 2000. http://www.lostremote.com/producer/personal.html, 2 pages.

The Wave Report, Feb. 12, 1999, 2 pages, http://www.wave-report.com/1999_Wave_Issues/wave9013.html.

\* cited by examiner

| | | |
|---|---|---|
| 400 { | Content ID | CRID://www.sonypictures.com/WO4HU3CANG2LONG2 |
| | Title | "Crouching Tiger, Hidden Dragon" |

*... other descriptive metadata...*

| | | |
|---|---|---|
| 410 { | Authorization | Hardware ID: 00022D2BE40B |
| | | Key: 00: ca: fa: 79: 98: 8f: 19: f8: d7: de: e4: 49: 80 |
| | | User ID: creubank |
| 420 { | Authorization | Hardware ID: 0008C74B6D7A |
| | | Key: ed: 27: 40: 4d: 86: b3: 05: c0: 01: bb: 50: 15: c9 |
| | | User ID: creubank |

METHOD AND SYSTEM FOR CONTENT SHARING AND AUTHENTICATION BETWEEN MULTIPLE DEVICES

FIELD OF THE INVENTION

The present invention relates to the field of personal video recorders. More particularly, the present invention relates to the field of content sharing and authentication between multiple personal video recorders.

BACKGROUND

The Personal Video Recorder (PVR) has in recent years become a popular alternative to VCRs because it allows random access to content and simplified management of recorded content. However, the current generation of PVRs allow only limited customization based on user preferences, and do not support multiple service providers.

Commercial systems exist that instruct the recording machine to record specific programs at known times and from known broadcast channels. Two such commercial systems currently used are the ReplayTV system manufactured by ReplayTV, Inc., of Mountain View, Calif. and the TiVo system manufactured by TiVo, Inc. of Sunnyvale, Calif. These systems typically use one or more transmission channels (e.g., telephone lines), different from the channels used to broadcast video programs, to receive codes that identify the time and broadcast channel of viewer-designated programs. The systems then record the identified programs for later output to the viewer. Both the TiVo and ReplayTV systems allow transfer of content between PVRs of the same type, however, the content is transferred over a local network connecting the systems and the service subscriber for each of the PVRs must be the same to provide necessary authorization.

Management of the storage space used by such recording devices is typically performed by the user. In some circumstances, a small portion of the storage space is managed by the system provider, such as TiVo or ReplayTV. For example, a small portion of the storage space is dedicated for "showcasing", which is managed by the system provider for a third party desiring to place specific content, such as an advertisement, in the small portion of storage space.

Current PVR configurations include one or two tuners for decoding received content from a single service provider, such as a cable or satellite service provider, and a single storage unit, typically a disk drive, to store the content. Managing the storage and use of the content is substantially performed by the user.

Conventional PVRs show some level of automatic content management. For example, old content is automatically overwritten with new content once the storage capacity is reached. The TiVo system does provide automatic content acquisition not explicitly requested by the user, but which may be a match for the user based on previously watched content or a rating system. However, neither the TiVo system not the Replay TV system provides editorial content management by the service provider, other than the limited case of a reserved "showcase" area within the system. Without editorial content management, the service provider can not selectively remove or replace content.

Additionally, current personal video recorders allow only limited movement of storage media from one PVR to another, as discussed above. Furthermore, most PVRs on the market today do not handle content that requires authentication. As PVRs become more prevalent, and as standards mature, PVRs will begin to add additional value to consumers by offering premium content that is not available on free-to-air television. In a PVR system that stores content on removable media, content that requires authentication, for example content that the viewer must pay for, must be re-authenticated when the content moves from one PVR to another.

SUMMARY

A method of accessing content data including receiving a content data on a first storage module of a first recording base station from a content source, wherein the content is encrypted, storing the content data on the first storage module, transmitting an authorization request to an external authorization service, validating the authorization request, and providing an authorization key to the first recording base station such that the first recording base station accesses the content data on the first storage module using the authorization key, wherein the authorization key associates the content data to the first recording base station. The first storage module can receive content data from only a select one content source. The authorization request can include a unique hardware identifier associated with the first recording base station. Validating the authorization request can include accessing information associated with the unique hardware identifier. Validating the authorization request can also include completing a transaction between the authorization service and the content source. The authorization key and the unique hardware identifier can be stored on the first storage module. The authorization request can include a unique content identifier associated with the content data. The unique content identifier can be provided by the content source. The authorization request can include a unique user identification associated with a user of the first storage module. The authorization key can include usage rules to regulate access to the content data. The authorization key can be stored on the first recording base station. The method can also include removing the first storage module from the first recording base station, connecting the first storage module to a second recording base station, transmitting a second authorization request to the authorization service, validating the second authorization request, and providing a second authorization key to the second recording base station such that the second recording base station accesses the content data on the first storage module using the second authorization key. The second authorization key can associate the content data to the second recording base station. The second authorization key can be stored on the second recording base station. The second authorization request can include a second unique hardware identifier associated with the second recording base station. Validating the second authorization request can include accessing information associated with the second unique hardware identifier. The second authorization key and the second unique hardware identifier can be stored on the first storage module. The second authorization request can include the unique content identifier associated with the content data. The second authorization request can include the unique user identification associated with the user of the first storage module. The second authorization key can include usage rules to regulate access to the content data. The content data can be multimedia content data.

A method of accessing content data includes receiving a content data on a first storage module of a first recording base station from a content source, wherein the content data is encrypted, communicating a first authorization transaction between the first recording base station and an external authorization service thereby providing the first recording base station access to the content data on the first storage module, de-coupling the first storage module from the first recording base station and coupling the first storage module to a second recording base station, and communicating a second authorization transaction between the second recording base station and the external authorization service thereby providing the second recording base station access to the content data on the first storage module. Communicating the first authorization transaction can include transmitting a first authorization request from the first recording base station to the authorization service, validating the first authorization request by the authorization service, and providing a first authorization key to the first recording base station. The first authorization request can include a first unique hardware identifier associated with the first recording base station. Validating the first authorization request can include accessing information associated with the first unique hardware identifier. The first authorization key and the first unique hardware identifier can be stored on the first storage module. The first authorization request can include a unique content identifier associated with the content data. The unique content identifier can be provided by the content source. The first authorization request can include a unique user identification associated with a user of the first storage module. The first authorization key can include usage rules to regulate access to the content data. The first authorization key can be stored on the first recording base station. Communicating the second authorization transaction can include transmitting a second authorization request from the second recording base station to the authorization service, validating the second authorization request by the authorization service, and providing a second authorization key to the second recording base station. The second authorization key can associate the content data to the second recording base station. The second authorization key can be stored on the second recording base station. The second authorization request can include a second unique hardware identifier associated with the second recording base station. Validating the second authorization request can include accessing information associated with the second unique hardware identifier. The second authorization key and the second unique hardware identifier can be stored on the first storage module. The second authorization request can include a unique content identifier associated with the content data. The second authorization request can include a unique user identification associated with a user of the first storage module. The second authorization key can include usage rules to regulate access to the content data.

A system to access content data includes a first recording base station including a removable storage module, a content source to provide an encrypted content data to the first storage module, an authorization service to provide authorization for the first recording base station to access the content data on the first storage module, and a second recording base station configured to connect to the removable storage module after the removable storage module is detached from the first recording base station, wherein the authorization service provides authorization for the second recording base station to access the content data on the first storage module. The first recording base station can include a first unique hardware identifier and the second recording base station includes a second unique hardware identifier. The content data can include a unique content identifier. A first authorization key can be provided by the authorization service to the first recording base station, the first authorization key associates the content data to the first recording base station. The first authorization key can be stored on the first storage module. The first authorization key can be stored on the first recording base station. A second authorization key can be provided by the authorization service to the second recording base station, the second authorization key associates the content data to the second recording base station. The second authorization key can be stored on the first storage module. The second authorization key can be stored on the second recording base station.

A personal video recorder includes one or more storage modules each configured to receive and store encrypted content data, and a recording base station removably coupled to the one or more storage modules, the recording base station including a controller to send an authorization request and to receive an authorization key used to decrypt the encrypted content data stored on one of the storage modules, each authorization key associates the personal video recorder to the encrypted content data. The personal video recorder can also include a unique hardware identification associated with the personal video recorder, wherein the authorization request includes the unique hardware identification. The encrypted content data stored on the one storage module can include a content identification, further wherein the authorization request includes the content identification. The recording base station can also include a memory unit coupled to the controller, wherein the memory unit stores the received authorization key. The one storage device can store the received authorization key. Each storage module can be dedicated to receive content data from a single content source. The controller can be configured to send an additional authorization request and receive an additional authorization key for each encrypted content data stored in the one or more storage modules.

BRIEF DESCRIPTION OF THE DRAWINGS

FIG. 7 illustrates an example of information about content that is stored on the removable storage module.

DETAILED DESCRIPTION

Embodiments of a personal video recorder (PVR) are directed to a hardware and software system for the delivery of audio-visual content and associated metadata to storage devices. The PVR is configured to access a plurality of services using a plurality of storage modules. Each storage module is dedicated to a single designated content provider. Content provided by multiple content providers can be bundled and distributed by a single service provider, such as a cable or satellite service provider. Alternatively, a content provider can provide content independent of other content providers, or a service provider can provide distribution of a single content source.

In a first embodiment, the plurality of storage modules are integrated within the PVR to form an integrated device. In a second embodiment, one or more of the plurality of storage modules are removably coupled to the PVR such that each removably coupled storage module can be disconnected from the PVR. In this second embodiment, the detached storage module can be reconnected to another PVR different from the PVR from which the storage module was detached. Where authorization is required to access content stored on the storage module, authentication is performed each time the removable storage module is reconnected to a PVR.

A plurality of users can be registered with each PVR, each of whom has one or more associated set of user preferences. Each user is uniquely identified by a user ID.

The personal video recorder is best described while considering the accompanying drawings below. Common elements maintain their references numerals throughout the Figures.

Figure 1:
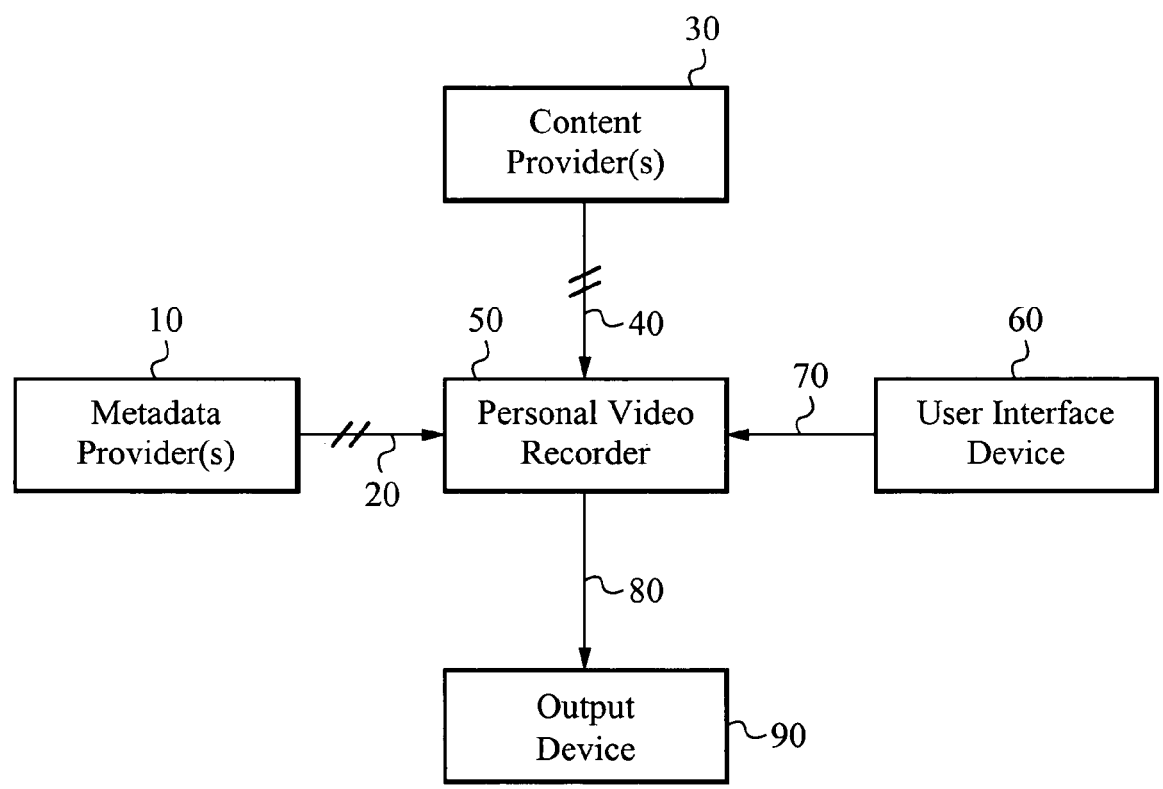
FIG. 1 illustrates a block diagram of a system environment including a personal video recorder.

FIG. 1 illustrates a block diagram of a system environment including a personal video recorder 50. The system includes the PVR 50, a plurality of metadata providers 10, a plurality of content providers 30, a user interface device 60, and an output device 90. The plurality of metadata providers 10 use a plurality of network connections 20 to provide descriptive information (metadata) about multimedia content to personal video recorder 50. The plurality of content providers 30 use a plurality of network connections 40 to send multimedia content to the personal video recorder 50. Examples of network connections 20 and 40 include terrestrial, satellite, cable and Internet broadcasts networks. In some cases, one or more content providers 30 and one or more metadata providers 10 are the same entity.

In an alternative embodiment, the plurality of metadata providers 10 use a single common network connection 20. Similarly, the plurality of content providers 30 can share a common network connection 40. In the case where the plurality of network connections 20 and 40 each represent a single connection, the network connection 20 is the same network connection as the network connection 40, for example, a terrestrial television broadcast channel.

Personal video recorder 50 stores content from the plurality of content providers 30 and stores metadata from the plurality of metadata providers 10. Metadata is associated with specific content items, as is well known in the art. Personal video recorder 50 also outputs content to output device 90 over audio-video connection 80. For example, connection 80 is a set of analog audio and video cables, or an IEEE 1394 (i.LINK) digital connection. Examples of output device 90 include, but are not limited to, a video terminal such as a monitor or television, and an audio output device such as an audio amplifier and speakers. Personal video recorder 50 receives input from user interface device 60 over connection 70. An exemplary user interface device 60 is a remote controller, which typically uses an infrared protocol to connect to personal video recorder 50.

Although FIG. 1 illustrates the PVR 50 coupled to a plurality of content providers 30, the PVR 50 can also be coupled to a plurality of service providers. Each service provider can provide content originated from one or more content providers.

Each PVR 50 includes one or more storage modules, each storage module dedicated to store content provided by a single content provider. In the case where a service provider provides a single content source, the storage module is dedicated to the service provider.

Figure 2:
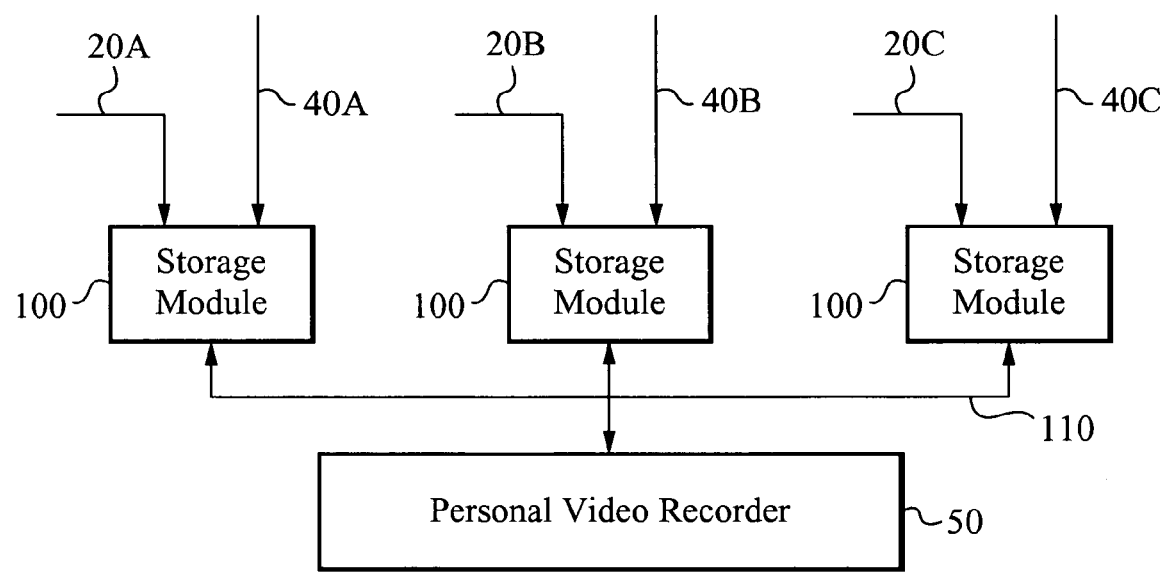
FIG. 2 illustrates the personal video recorder connected to a plurality of external storage modules.

The PVR 50 supports a plurality of services, each service utilizing a separate storage module. FIG. 2 illustrates the PVR 50 connected to a plurality of external storage modules 100 via a bus 110. Each storage module 100 is a non-volatile, recordable storage device that is capable of storing and retrieving A/V content and metadata. Typically, each storage module 100 is a hard disk or flash-memory storage unit. Each storage module 100 is connected to a content network connection 40 and a metadata network connection 20. As illustrated in FIG. 2, each storage module 100 is independently coupled to a content network connection 40a, 40b, 40c and to a metadata network connection 20a, 20b, 20c. Alternatively, each content network connection 40a, 40b, and 40c are the same connection. Still alternatively, each metadata network connection 20a, 20b, and 20c are the same connection. In an alternative embodiment, each of the storage modules 100 are integrated within the PVR 50. In this alternative embodiment, the integrated storage modules 100 can either be removable or permanent.

Figure 3:
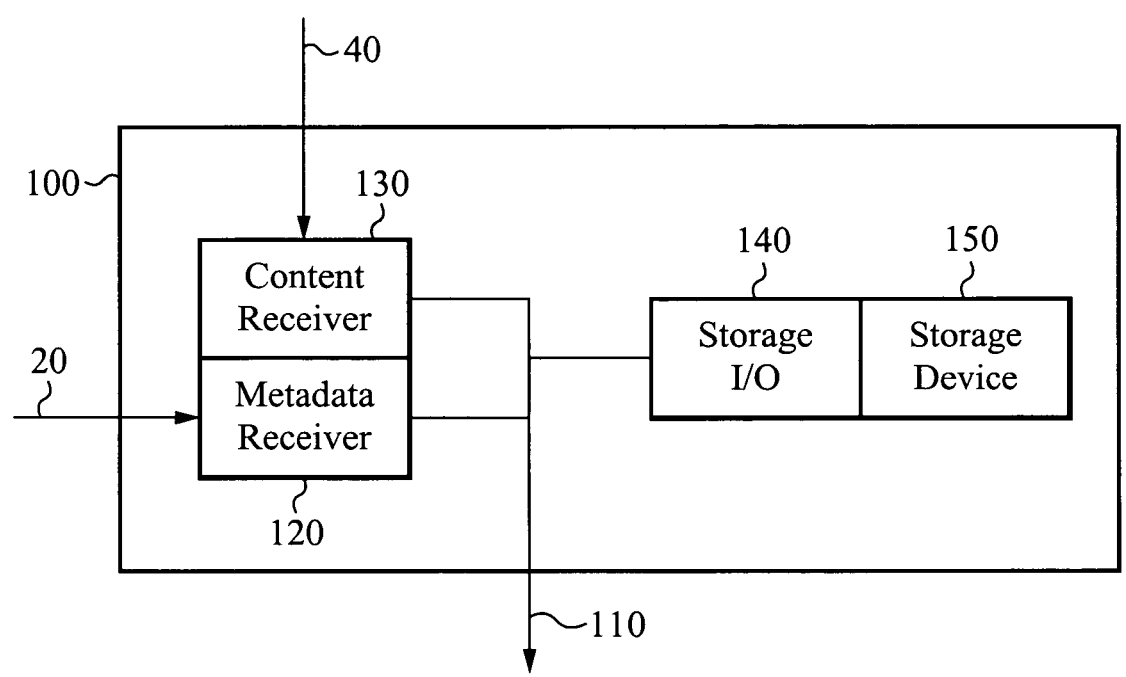
FIG. 3 illustrates a block diagram of the single storage module.

FIG. 3 illustrates a block diagram of the single storage module 100. Metadata receiver 120 receives metadata from the metadata network connection 20. An example of a metadata receiver is an MPEG-2 decoder that retrieves data embedded into a broadcast MPEG-2 stream. Content receiver 130 receives content from content network connection 40. An example of a content receiver is a digital television tuner. Receivers 120 and 130 are connected to bus 110 from which each receives data and control commands, output data, and status information.

Storage I/O controller 140 receives and executes commands to read and write to storage device 150. An example of a storage I/O controller is a SCSI controller or IDE hard disk drive controller. Storage device 150 is the physical storage device, such as a hard disk drive or a flash memory unit. Those skilled in the art will recognize that bus 110 can equivalently be substituted by a plurality of busses, for example, a PCI bus to control receivers 120 and 130, and a high speed bus, such as an IEEE1394 (i.LINK) serial bus, to send and receive data and commands from storage I/O controller 140.

Figure 4:
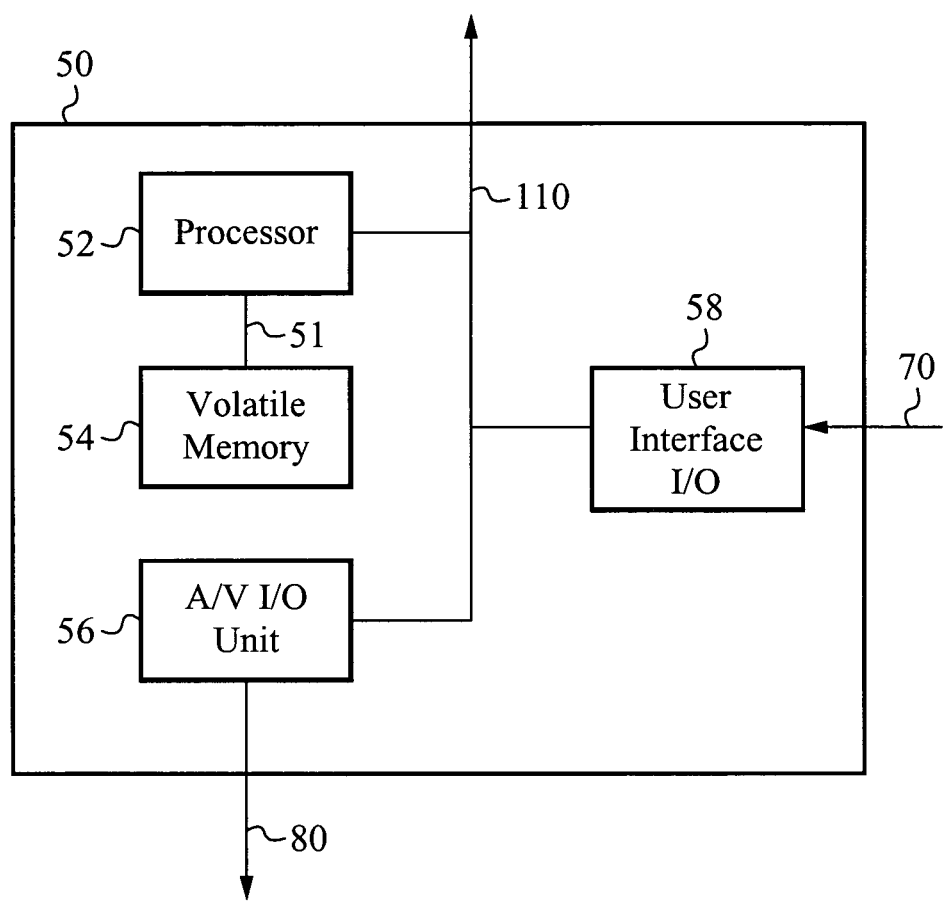
FIG. 4 illustrates an exemplary internal configuration of the personal video recorder.

FIG. 4 illustrates an exemplary internal configuration of the PVR 50. The PVR 50 includes a processor 52, a volatile memory 54, an audio/video input/output unit 56, and a user interface input/output 58. The processor 52 receives data and commands from the common bus 110 and a high-speed memory bus 51, executes commands, and outputs data to busses 110 and 51. Processor 52 uses the high-speed memory bus 51 to connect to volatile memory 54. Volatile memory 54 is used to temporarily store data and commands. Also connected to bus 110 is user interface I/O 58 and A/V I/O interface unit 56.

A/V I/O interface unit 56 is used to control video and/or audio output of PVR 50. Separate I/O controllers for audio and video content can be substituted for a single controller with equivalent results. In FIG. 4, processor 52 sends commands and data to output audio/video content to A/V output controller 56 over bus 110. Alternatively, one or more separate busses can be used instead of a common bus to reduce traffic on common bus 110. For example, an Accelerated Graphics Port (AGP) bus is often used for the output of video data and control data. Volatile memory 54 is used to store temporary data and program commands used by processor 52. User interface I/O unit 58 is used to receive input from user interface connection 70 and to communicate these commands to processor 52. An example of a user interface I/O unit is a serial infrared remote controller.

The PVR 50 is also configured with software components to construct a highly personalized presentation of stored A/V content in accordance with a user's profile and viewing habits. The PVR 50 utilizes a Cache Manager, a Content Manager, a Profile Manager, a ShowFlow Manager, and a Presentation Manager.

The Cache Manager manages raw data as it is received in the storage modules, including acquisition of content from the content providers and metadata providers, and also removes invalid data. The Cache Manager supports data that has been pushed by the content provider, as well as data that has been "pulled" by the user, such as content requested by the user via a two-way network such as the Internet. In this manner content can be provided to the PVR either by the content provider or requested by the user.

The Content Manager manages content once it is stored in the storage modules. The Content Manager decides what content will be acquired based on metadata associated with the content and based on user preferences. The Content Manager further manages the validity of stored content. It will, for example, enforce rights management rules that are part of the metadata associated with a piece of content. For example, the rights management rules for a movie may specify that the movie must be deleted (or become inaccessible) after the consumer has viewed it once (or after a certain time period). The Cache Manager informs the Content Manager whenever new raw data is available (content or metadata). It is the responsibility of the Content Manager to maintain a list of valid content that is available to users for consumption.

The Profile Manager manages explicit and implicit preferences for users of the personal video recorder. Explicit preferences are those preferences that are explicitly set by the user, such as favorite actors or television show genres. Some explicit preferences may be specific to a single service, such as genre ratings. Other explicit preferences, such as favorite colors, preferred font type, and size for menus, are common to all services. Implicit preferences are those preferences that are learned by the PVR as a result of analyzing the viewing patterns of users. The Profile Manager coordinates with the Presentation Manager to create implicit preferences. Implicit preferences are service-specific, or in other words, implicit references are determined for and associated with specific associated content providers.

The ShowFlow Manager coordinates with the Content Manager to discover what content is available, and then consults the Profile Manager to order the content in a sequence that is tailored according to the user's preferences. The Show-Flow Manager recognizes triggers, pieces of metadata inserted by the metadata provider that cause certain content to be included in a playlist regardless of consumer preference. For example, a content provider might use triggers to play a series of advertisements in a particular order, even if the user's preferences would normally have played those advertisements back in a different order.

The PVR implements a "base ShowFlow Manager" to manage the playback and ordering of content for all services. As used herein, each "service" refers to content provided by each dedicated content provider associated with the storage modules within the PVR. For example, the base ShowFlow Manager maintains a "master" table of contents that is the union of the content available from all services. Each service also has a ShowFlow Manager that manages playlists for just that service. The base ShowFlow Manager works together with each individual service ShowFlow Manager when a user wishes to access content from more than one service. Operation of the ShowFlow Manager is described in greater detail in the U.S. patent application Publication 2002/0170068, filed Mar. 19, 2001, and entitled "Virtual and Condensed Television Programs", which is also hereby incorporated in its entirety by reference.

The Presentation Manager manages display real estate and rendering of A/V content and non-content graphical elements. The ShowFlow Manager instructs the Presentation Manager what to display and how it should be displayed. This is done by either creating a presentation script that contains detailed instructions on what to display, or the ShowFlow Manager can alternatively simply pass a handle to the metadata of the content, or asset to be displayed, and let the Presentation Manager decide how to display it. The Presentation Manager maintains the display hardware's capabilities and is therefore uniquely qualified to render content based on this information.

Figure 5:
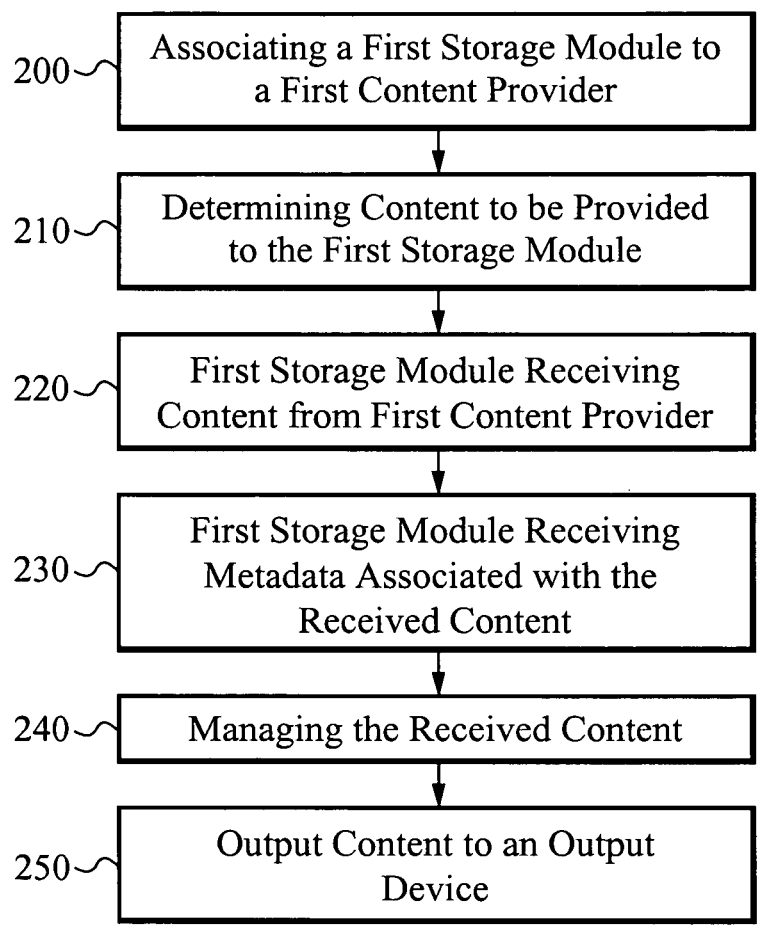
FIG. 5 illustrates a method of receiving content utilizing the personal video recorder as implemented within the system of FIG. 1.

FIG. 5 illustrates a method of receiving content utilizing the personal video recorder as implemented within the system of FIG. 1. In the step 200, a first storage module within the personal video recorder is associated with a specific content provider. In this manner, the first storage module is dedicated to receive and store content only from the associated content provider. As the sole content provider to the first storage module, the associated content provider maintains control of managing what content is provided to the first storage module. In the step 210, the content provider determines specific content to be sent to the first storage module. The content provider can determine the specific content to be sent based on any determining criteria. In one embodiment, a user associated with the first storage device has input a set of user preferences, as managed by the Profile Manager described above, and the determination criteria uses the user preferences to provide content that best matches the user preferences.

In the step 220, the first storage module receives and stores the content sent by the content provider. In the step 230, the first storage module receives and stores metadata associated with the received content. As described in detail above, the metadata can be provided by a metadata provider. The metadata provider can be different than the content provider, or the metadata provider and the content provider can be one and the same. It is understood that while the method describes two separate steps for receiving the content and the associated metadata, the content and the metadata can be received concurrently, or the content and the metadata can be sent together, as when the content provider and the metadata provider are the same.

In the step 240, the received content and the received associated metadata, are managed by the personal video recorder using the Cache Manager, the Content Manager, and the ShowFlow Manager, as described in detail above. In the step 250, content is output to an output device using the Presentation Manager.

As described above, one or more of the plurality of storage modules can be removably coupled to the PVR such that each removably coupled storage module can be disconnected from the PVR. The detached storage module can be reconnected to another PVR different from the PVR from which the storage module was detached. Where authorization is required to access content stored on the storage module, authentication is performed such that a first personal video recorder currently connected to the storage module is granted access to the content on the storage module. The authorization process is performed for each encrypted content item downloaded onto the storage module. If the storage module is disconnected from the first personal video recorder and then reconnected to a second personal video recorder, then authentication is performed to grant the second personal video recorder access to the content on the storage module. If the storage module is subsequently reconnected to the first personal video recorder, re-authorization may not be required if the original authorization parameters are still valid. If the original authorization parameters are not valid, the first personal video recorder must be re-authorized to access the content on the storage module.

Figure 6:
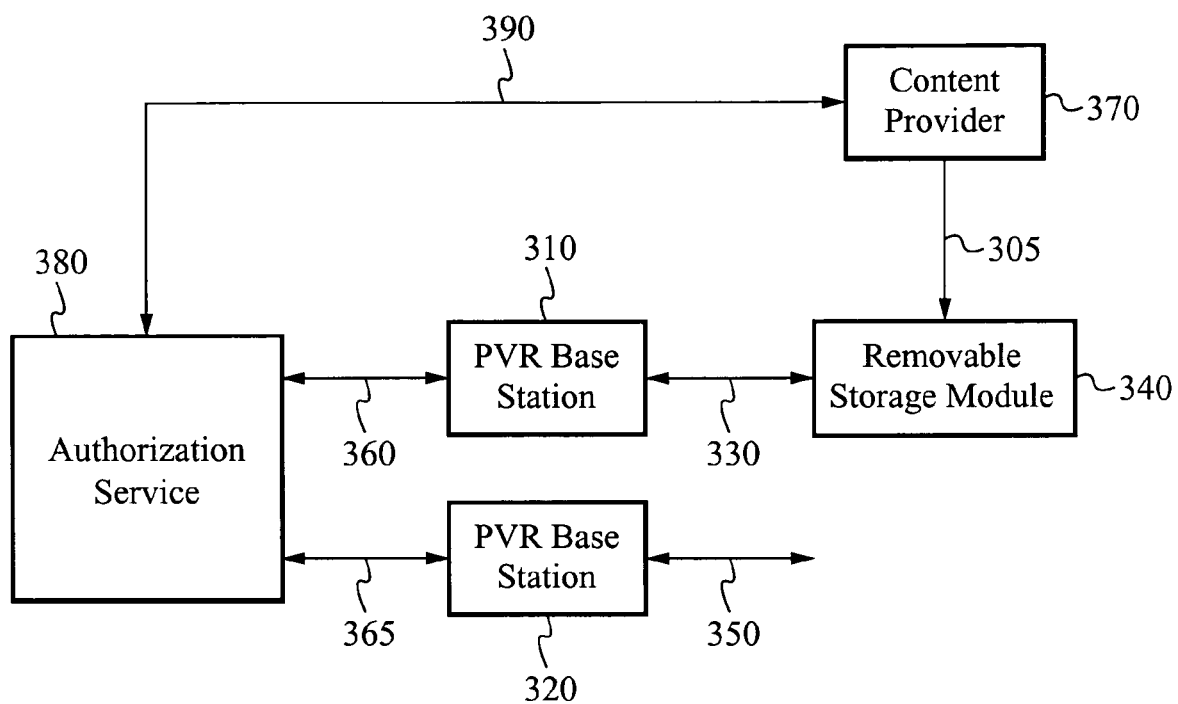
FIG. 6 illustrates a block diagram of a system used for authenticating content when the content stored on a removable media is moved from one PVR to another PVR.

FIG. 6 illustrates a block diagram of a system used for authenticating content when the content stored on a removable media is moved from one PVR to another PVR. In the system of FIG. 6, the removable media is a removable storage module of the type described in detail above. A PVR base station 310 controls the acquisition, maintenance and display of content. PVR base station 310 is connected to removable storage module 340 via high-speed bus 330. Removable storage module 340 is comprised of a non-volatile storage such as a hard disk or flash memory, and a content receiver such as a programmable television tuner. Alternatively, the content receiver can reside within the PVR base station 310 instead of in the removable storage module 340. Content is received from a content provider 370 over network connection 305. Network connection 305 can be a satellite television, cable television, terrestrial television, Internet, or other transmission means.

Content that is transmitted from content provider 370 to the removable storage module 340 can be encrypted and as such, requires authorization before it can be viewed. If the content is encrypted when it is transmitted, then it is also stored in an encrypted form. The PVR base station 310 has a unique hardware identifier, such as a MAC (Medium Access Control) address from a network interface. In order to decode encrypted content, the PVR base station 310 sends its hardware identifier, and a unique content identifier received from the content provider to authorization service 380 over bidirectional network connection 360. Network connection 360 can be an intermittent connection, such as a phone line, that is only connected when needed.

For authorization, the PVR base station 310 can optionally also transmit to the authorization service user identification information when the PVR supports multiple users, additional authentication information to prove that the PVR or user identifier has not been tampered with, usage selection information such as view once, view for 24 hours, view without commercials, etc., and/or payment information such as credit card information or payment account information.

Authorization service 380 uses an authorization means to determine whether or not to grant PVR base station 310 authorization to access the requested content. The authorization service 380 can use additional information about the requesting PVR to make this decision. For example, the authorization service 380 can access a customer database to verify that the user's account is valid and paid. Or, the authorization service 380 can access a credit card authorization service to ensure that a credit card used for payment is valid. In some cases, authorization service 380 can perform accounting or other transactions with content provider 370 over network connection 390. In this case, network connection 390 is a secure network. In an alternate embodiment, authorization service 380 and content provider 370 are the same entity, and thus do not require network connection 390.

If authorization service 380 accepts the request, then authorization service 380 returns a key to PVR base station 310 over network connection 360. PVR base station 310 uses the key to decrypt content on removable storage module 340 and display the decrypted content to the user.

PVR base station 310 saves the authorization information used to decrypt the content. In one embodiment, the key is saved, along with additional metadata about the content, on the removable storage module 340. In this case, the hardware identifier corresponding to the PVR base station 310 is also saved with the key. Storing the authorization information on the same physical medium as the content and related descriptive metadata simplifies management of such information when content is subsequently deleted.

FIG. 7 illustrates an example of information about content that is stored on the removable storage module 340. Such information includes descriptive metadata 400, including a unique content identifier. The content identifier is sent along with the content by the content provider 370. Authorization information 410 and 420 includes the hardware identifier of the base station, the key to decrypt the encrypted content data, and, optionally, user identification information. As related to FIG. 6, authorization information 410 corresponds to PVR base station 310. As such, the hardware ID 00022D2BE40B shown in authorization information 410 is the unique hardware identifier of PVR base station 310.

Removable storage module 340 can be physically detached from bus 330 and connected to a second PVR base station 320 via a second bus 350. In this case, encrypted content that has not been authorized for viewing on PVR base station 320 must be re-authorized via the same process outlined above. The PVR base station 320 sends its unique hardware identifier to authorization service 380 over bi-directional network connection 365. Network connection 365 can be an intermittent connection, such as a phone line, that is only connected when needed. If authorization service 380 accepts the authorization request from the second PVR base station 320, then the authorization service 380 returns a second key to PVR base station 320 over network connection 365. PVR base station 320 uses the second key to decrypt the encrypted content on removable storage module 340 and displays the decrypted content to the user.

PVR base station 320 saves the authorization information used to decrypt the content. In one embodiment, the key is saved along with additional metadata about the content on the removable storage module 340. In this case, the hardware identifier corresponding to the PVR base station 320 is also saved with the key. Authorization information 420 (FIG. 7) corresponds to PVR base station 320. As such, the hardware ID 0008C74B6D7A shown in authorization information 420 is the unique hardware identifier of PVR base station 320.

Authorization information, such as authorization information 410 and 420, can alternatively be stored on the PVR base station for which authorization is granted, instead of on the removable storage module 340. Such an implementation makes it more difficult to manage authorization content, but obviates the need to include the hardware identifier in the authorization information.

Some content can be stored in a non-encrypted format. For example, free-to-air content that is covered by fair-use laws can be stored without encryption. If such an option is implemented, then the system uses an encryption identification means to determine whether or not the content is encrypted.

The system can support a plurality of encryption schemes. In this case, an encryption scheme identification means is used to determine what encryption scheme is being used. Such a system is useful when content can be transmitted via a plurality of transport means (Internet, satellite, digital terrestrial television).

Figure 8:
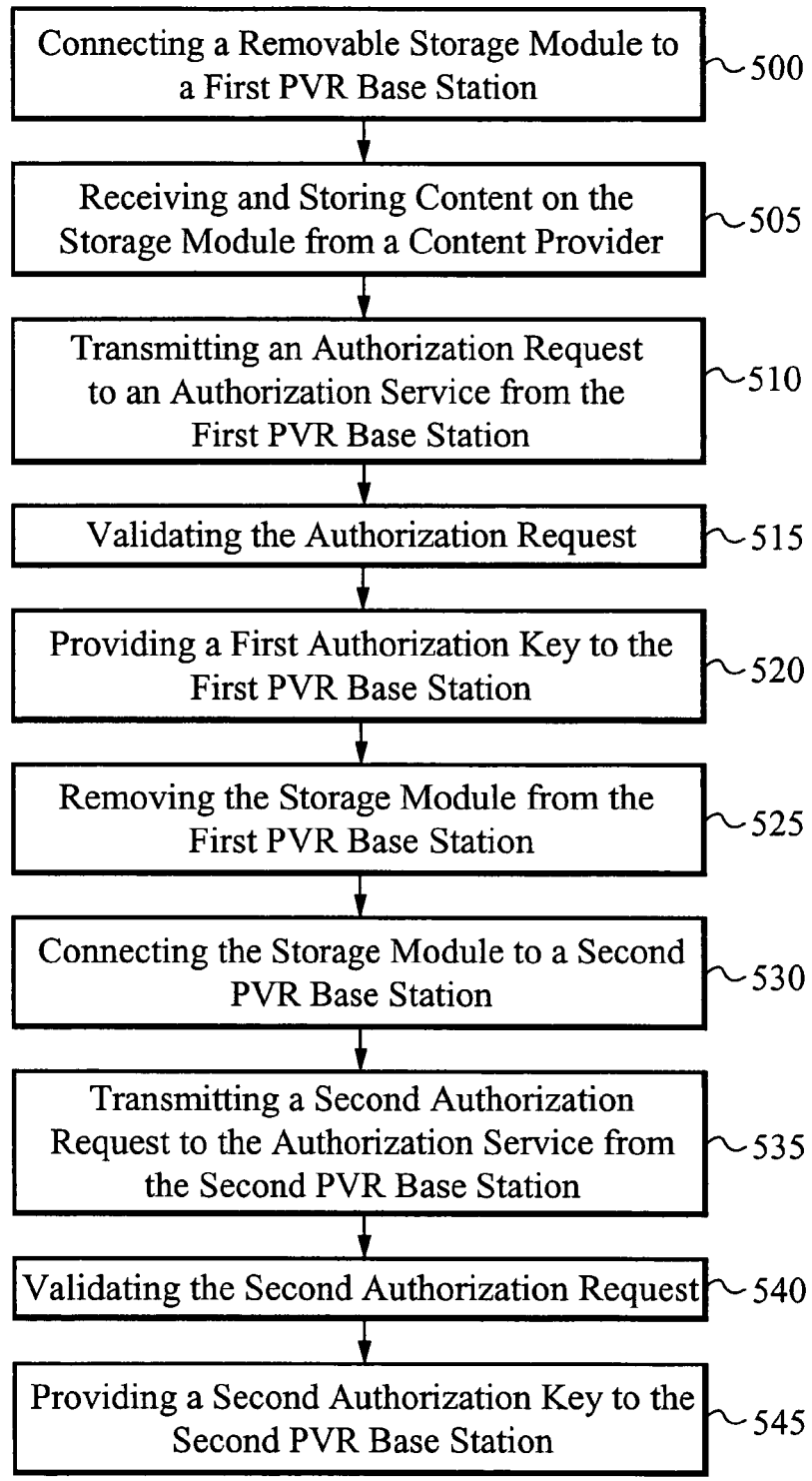
FIG. 8 illustrates a method of authenticating content on a removable storage module when the removable storage module is moved from one PVR to another PVR.

FIG. 8 illustrates a method of authenticating content on a removable storage module when the removable storage module is moved from one PVR to another PVR. The method illustrated in FIG. 8 is described in relation to the system of FIG. 6. In the step 500, the removable storage module 340 is connected to the first PVR base station 310. In the step 505, encrypted content is received by and stored on the storage module 340. The content is provided by the content provider 370. In the step 510, an authorization request is transmitted to the authorization service 380 from the first PVR base station 310. The authorization request is of the type described above and includes a content identification associated with the content stored on the storage module and a unique hardware identification associated with the first PVR base station 310. At the step 515, the authorization request is validated by the authorization service 380.

At the step 520, a first authorization key is provided by the authorization service 380 to the first PVR base station 310. The first authorization key associates the content on the storage module 340 to the first PVR base station 310. The first PVR base station 310 uses the authorization key to decrypt the encrypted content stored on the storage module 340.

At the step 525, the storage module 340 is removed, or disconnected, from the first PVR base station 310. At the step 530, the storage module 340 is connected to the second PVR base station 320. To access the encrypted content stored on the storage module 340, the second PVR base station 320 must receive authorization in a manner similar to that described above in relation to the first PVR base station 310 receiving authorization. At the step 535, a second authorization request is transmitted to the authorization service 380 from the second PVR base station 320. The second authorization request is of the type described above and includes the content identification associated with the content stored on the storage module and a second unique hardware identification associated with the second PVR base station 320. At the step 540, the second authorization request is validated by the authorization service 380.

At the step 545, a second authorization key is provided by the authorization service 380 to the second PVR base station 320. The second authorization key associates the content on the storage module 340 to the second PVR base station 320. The second PVR base station 320 uses the authorization key to decrypt the encrypted content stored on the storage module 340.

If the storage module 340 is disconnected from the second PVR base station 320 and connected to a third PVR base station, then the third PVR base station would request and receive authorization to access the content stored on the storage module in a manner similar to that described above in relation to the first PVR base station 310 and the second PVR base station 320. In this manner, the removable storage module 340 can be connected to any number of PVR base stations, and authorization can be requested and granted to access content on the storage module by any newly connected PVR base station.

If the removable storage module 340 is re-connected to a previously connected and authorized PVR base station, such as connecting the storage module 340 to the first PVR base station 310 subsequent to the step 545, then the previously authorized PVR base station can use the previously granted authorization key to access the content on the storage module 340. In this case, any requirements associated with the previously granted authorization key must still apply. For example, the previously granted first authorization key, which associates the content to the first PVR base station 310, can include a time period for which the first authorization key remains valid. Upon re-connecting the storage module 340 to the first PVR base station 310, the first PVR base station 310 can use the first authorization key to access the content if the time period has not yet elapsed. If the time period has elapsed, then the first PVR base station 310 must again go through the authorization process to receive a new valid authorization key.

In operation, a personal video reorder including one or more removable storage modules receives content from a content provider. Each storage module is dedicated to a single content provider such that the content provided by a first content provider is received and stored by a first storage module. Metadata associated with the content is sent either by a separate metadata provider or by the content provider. The content metadata is stored along with the content on the corresponding dedicated storage module. Selection of content to be sent to the storage module is managed by the content provider. User preferences are maintained and are used by the content provider to select the content to be sent. Content stored on the storage module is output by the personal video recorder to an output device, such as a television.

Some or all of the content provided by the content provider may be encrypted and require authorization to be viewed. In this case, the encrypted content sent by the first content provider is received by the personal video recorder and stored on the first storage module connected to the personal video recorder, as described above. To output the received encrypted content, the personal video recorder must decrypt the encrypted content stored on the first storage module. To decrypt the encrypted content, the personal video recorder transmits an authorization request to an external authorization service, which may or may not be the same entity as the first content provider. The authorization service validates the authorization request and transmits a first authorization key to the first personal recorder. The first personal video recorder uses the first authorization key to decrypt and output the encrypted content stored on the first storage module.

Since the first storage module is removable, the first storage module can be moved from the first personal video recorder to a second personal video recorder. In order for the second personal video recorder to decrypt and output the encrypted content stored on the first storage module, the second personal video recorder must receive authorization from the authorization service in a similar manner as that described above. The second personal video recorder transmits a second authorization request to the authorization service. The authorization service validates the second authorization request and sends a second authorization key to the second person video recorder. The second personal video recorder uses the second authorization key to decrypt and output the encrypted content stored on the first storage module. The removable storage module can be connected to any number of personal video recorders to output the stored encrypted content in this manner.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of accessing content data, the method comprising:
   receiving a content data on a storage module of a first recording base station from a content source, wherein the content is encrypted and the storage module comprises a tuner dedicated to the content source;
   storing the content data on the storage module;
   transmitting an authorization request to an external authorization service, wherein the external authorization service validates the authorization request;

receiving a first authorization key with the first recording base station, wherein the first recording base station accesses the content data on the storage module using the first authorization key and the first authorization key associates the content data to the first recording base station;

removing the storage module from the first recording base station;

connecting the storage module to a second recording base station;

transmitting a second authorization request to the external authorization service, wherein the external authorization service validates the second authorization request; and receiving a second authorization key to the second recording base station, wherein the second recording base station accesses the content data on the storage module using the second authorization key and the second authorization key is specific to the second recording base station.

2. The method of claim 1 wherein the authorization request includes a unique hardware identifier associated with the first recording base station.

3. The method of claim 2 wherein the external authorization service validating the authorization request comprises accessing information associated with the unique hardware identifier.

4. The method of claim 3 wherein the external authorization service validating the authorization request further comprises completing a transaction between the authorization service and the content source.

5. The method of claim 2 wherein the first authorization key and the unique hardware identifier are stored on the storage module.

6. The method of claim 1 wherein the authorization request includes a unique content identifier associated with the content data.

7. The method of claim 6 wherein the unique content identifier is provided by the content source.

8. The method of claim 1 wherein the authorization request includes a unique user identification associated with a user of the storage module.

9. The method of claim 1 wherein the first authorization key includes usage rules to regulate access to the content data.

10. The method of claim 1 wherein the first authorization key is stored on the first recording base station.

11. The method of claim 1 wherein the second authorization key associates the content data to the second recording base station.

12. The method of claim 11 wherein the second authorization key is stored on the second recording base station.

13. The method of claim 1 wherein the second authorization request includes a second unique hardware identifier associated with the second recording base station.

14. The method of claim 13 wherein validating the second authorization request comprises accessing information associated with the second unique hardware identifier.

15. The method of claim 13 wherein the second authorization key and the second unique hardware identifier are stored on the storage module.

16. The method of claim 1 wherein the second authorization request includes the unique content identifier associated with the content data.

17. The method of claim 1 wherein the second authorization request includes the unique user identification associated with the user of the storage module.

18. The method of claim 1 wherein the second authorization key includes usage rules to regulate access to the content data.

19. The method of claim 1 wherein the content data is multimedia content data.

20. A method of accessing content data, the method comprising:

receiving a content data on a storage module of a first recording base station from a content source, wherein the content data is encrypted and the storage module comprises a tuner dedicated to the content source;

communicating a first authorization transaction between the first recording base station and an external authorization service thereby providing the first recording base station access to the content data on the storage module;

de-coupling the storage module from the first recording base station and coupling the storage module to a second recording base station; and communicating a second authorization transaction between the second recording base station and the external authorization service thereby providing the second recording base station access with an authorization key to the content data on the storage module, wherein the authorization key is specific to the second recording base station.

21. The method of claim 20 wherein communicating the first authorization transaction comprises:

transmitting a first authorization request from the first recording base station to the authorization service, wherein the authorization service validates the first authorization request; and receiving a first authorization key to the first recording base station.

22. The method of claim 21 wherein the first authorization request includes a first unique hardware identifier associated with the first recording base station.

23. The method of claim 22 wherein the authorization service validating the first authorization request comprises accessing information associated with the first unique hardware identifier.

24. The method of claim 21 wherein the first authorization key and the first unique hardware identifier are stored on the storage module.

25. The method of claim 21 wherein the first authorization request includes a unique content identifier associated with the content data.

26. The method of claim 25 wherein the unique content identifier is provided by the content source.

27. The method of claim 21 wherein the first authorization request includes a unique user identification associated with a user of the storage module.

28. The method of claim 21 wherein the first authorization key includes usage rules to regulate access to the content data.

29. The method of claim 21 wherein the first authorization key is stored on the first recording base station.

30. The method of claim 20 wherein communicating the second authorization transaction comprises;

transmitting a second authorization request from the second recording base station to the authorization service, wherein the authorization service validates the second authorization request by the authorization service; and receiving a second authorization key to the second recording base station.

31. The method of claim 30 wherein the second authorization key associates the content data to the second recording base station.

32. The method of claim 31 wherein the second authorization key is stored on the second recording base station.

33. The method of claim 30 wherein the second authorization request includes a second unique hardware identifier associated with the second recording base station.

34. The method of claim 33 wherein the authorization service validating the second authorization request comprises accessing information associated with the second unique hardware identifier.

35. The method of claim 33 wherein the second authorization key and the second unique hardware identifier are stored on the storage module.

36. The method of claim 30 wherein the second authorization request includes a unique content identifier associated with the content data.

37. The method of claim 30 wherein the second authorization request includes a unique user identification associated with a user of the storage module.

38. The method of claim 30 wherein the second authorization key includes usage rules to regulate access to the content data.

39. A system to access content data, the system comprising:
- a first recording base station including a removable storage module;
- a content source to provide an encrypted content data to the removable storage module, wherein the removable storage module comprises a tuner dedicated to the content source;
- an authorization service to provide authorization for the first recording base station to access the content data on the removable storage module; and
- a second recording base station configured to connect to the removable storage module after the removable storage module is detached from the first recording base station, wherein the authorization service provides authorization for the second recording base station to access the content data on the removable storage module and the authorization includes a key that is specific to the second recording base station.

40. The system of claim 39 wherein the first recording base station includes a first unique hardware identifier and the second recording base station includes a second unique hardware identifier.

41. The system of claim 40 wherein the content data includes a unique content identifier.

42. The system of claim 41 wherein a first authorization key is provided by the authorization service to the first recording base station, the first authorization key associates the content data to the first recording base station.

43. The system of claim 42 wherein the first authorization key is stored on the removable storage module.

44. The system of claim 42 wherein the first authorization key is stored on the first recording base station.

45. The system of claim 41 wherein a second authorization key is provided by the authorization service to the second recording base station, the second authorization key associates the content data to the second recording base station.

46. The system of claim 45 wherein the second authorization key is stored on the removable storage module.

47. The system of claim 45 wherein the second authorization key is stored on the second recording base station.

48. A personal video recorder comprising:
- one or more storage modules each configured to receive and store encrypted content data and each storage module comprises a tuner dedicated to receive content data from a single content source; and
- a recording base station removably coupled to the one or more storage modules, the recording base station including a controller to send an authorization request and to receive an authorization key used to decrypt the encrypted content data stored on one of the storage modules, each authorization key associates the personal video recorder to the encrypted content data and the each authorization key is specific to the personal video recorder.

49. The personal video recorder of claim 48 further comprising a unique hardware identification associated with the personal video recorder, wherein the authorization request includes the unique hardware identification.

50. The personal video recorder of claim 49 wherein the encrypted content data stored on one of the one or more storage modules includes a content identification, further wherein the authorization request includes the content identification.

51. The personal video recorder of claim 48 wherein the recording base station further comprising a memory unit coupled to the controller, wherein the memory unit stores the received authorization key.

52. The personal video recorder of claim 48 wherein one of the one or more storage devices stores the received authorization key.

53. The personal video recorder of claim 48 wherein the controller is configured to send an additional authorization request and receive an additional authorization key for each encrypted content data stored in the one or more storage modules.

54. A computerized method comprising:
- receiving a first authorization request to access encrypted content by a first personal video recorder, wherein the encrypted content is stored on a removable storage module coupled to the first personal video recorder and the removable storage module comprises a tuner dedicated to a content source;
- validating the first authorization request;
- transmitting a first authorization key to the first personal video recorder, wherein the first personal video recorder accesses the encrypted content data on the removable storage module with the first authorization key;
- receiving a second authorization request to access the encrypted content by a second personal video recorder coupled to the removable storage module, wherein the removable storage module is de-coupled from the first personal video recorder;
- validating the second authorization request; and
- transmitting a second authorization key to the second personal video recorder, wherein the second personal video recorder accesses the encrypted content data on the removable storage module with the second authorization key and the second authorization key is specific to the second recording base station.

* * * * *